United States Patent [19]

Chen et al.

[11] Patent Number: 5,552,371
[45] Date of Patent: Sep. 3, 1996

[54] YBA CUO-TYPE SUPERCONDUCTING MATERIAL BASED APPARATUS FOR AUTO-FILLING LIQUID NITROGEN

[75] Inventors: Yeow-Chin Chen; Ran-Jin Lin; Ru-Shi Liu, all of Hsinchu, Taiwan

[73] Assignee: Industrial Technology Research Institute, Hsinchu Hsien, Taiwan

[21] Appl. No.: 245,224

[22] Filed: May 17, 1994

[51] Int. Cl.$^6$ ........................................ G01F 23/24
[52] U.S. Cl. ................. 505/160; 505/780; 505/842; 73/295; 62/49.2; 141/198
[58] Field of Search ............... 141/198; 73/295; 62/49.2; 505/160, 780, 842

[56] References Cited

U.S. PATENT DOCUMENTS

| | | | |
|---|---|---|---|
| 4,129,848 | 12/1978 | Frank et al. | 73/295 X |
| 4,135,548 | 1/1979 | Sears | 62/49.2 X |
| 4,192,147 | 3/1980 | Gilbert et al. | 62/49.2 |
| 5,114,907 | 5/1992 | Erwin et al. | 73/295 X |
| 5,262,394 | 11/1993 | Wu et al. | 505/239 X |
| 5,317,006 | 5/1994 | Kumar | 204/298.12 |
| 5,376,624 | 12/1994 | Perez et al. | 505/780 X |
| 5,393,736 | 2/1995 | Hodge et al. | 505/160 |

*Primary Examiner*—J. Casimer Jacyna
*Attorney, Agent, or Firm*—W. Wayne Liauh

[57] ABSTRACT

An apparatus and method for continuously monitoring the liquid nitrogen level a liquid nitrogen container and automatically refilling liquid nitrogen from a liquid nitrogen reservoir when the liquid nitrogen in the container falls below a predetermined level. The apparatus comprises a liquid nitrogen level sensing element, which contains a superconducting material, such as a YbaCuO type superconductiing material, disposed on a non-conducting substrate, such as magnesium oxide. The superconducting material is selected such that it has a critical temperature approximately equal to the boiling point temperature of liquid nitrogen. The superconducting material is placed near the predetermined level and, under normal conditions, the superconducting material exhibits zero or near zero resistance. When the level of liquid nitrogen falls below the predetermined level due to heat loss or other reasons, the resistance of the superconducting material will increase substantially, thus triggering a control means to open a solenoid valve and allow liquid nitrogen to flow from the reservoir to the container. The liquid nitrogen level sensing element can be prepared by photochemically etching a superconducting layer, which has been deposited on the non-conducting substrate, in accordance with a serpentine design, to thereby increase the sensitivity and reliability thereof.

8 Claims, 7 Drawing Sheets

YBA CUO-TYPE SUPERCONDUCTING MATERIAL BASED APPARATUS FOR AUTO-FILLING LIQUID NITROGEN

FIELD OF THE INVENTION

The present invention relates to an apparatus and method for automatically filling liquid nitrogen into a liquid nitrogen container when the liquid nitrogen contained therein falls below a predetermined level. More specifically, the present invention relates to an apparatus and method, which utilizes a resister circuitry made of a superconducting material to monitor the amount of liquid nitrogen contained in a cryogenic container, for automatically charging liquid nitrogen into the cryogenic container when the amount of liquid nitrogen contained therein falls below a predetermined level.

BACKGROUND OF THE INVENTION

Liquid nitrogen, which has a boiling point at about 77K, is commonly employed in the industry, hospitals, and biomedical laboratories as the main cryogenic material to provide a low-temperature environment. However, even with heavy insulations, some heat, albeit very small, will gradually penetrate into the liquid nitrogen container, which can be in the form of a tank or wall linings, and cause the liquid nitrogen to vaporize. In order to ensure that the cryogenic environment is always maintained at or below a predetermined temperature, the amount of the liquid nitrogen in the container must be constantly monitored, and refilled if it falls below a predetermined level.

Conventionally, the level of the liquid nitrogen is monitored using a monitoring device belonging to the electric-capacitor type. The conventional monitoring device utilizes a pair of coaxial stainless steel tubes; it is operated based on the principle that liquid and gaseous nitrogen exhibits different electric capacitances, and a non-zero differential capacitance will be recorded if the upper tube contains gaseous nitrogen. One of the shortcomings of the conventional type monitoring/control system for liquid nitrogen refill is that it often malfunctions due to its relatively low sensitivity and thus fails to provide the intended control function, in addition to its relatively high manufacturing cost. As a result, the liquid nitrogen level is typically monitored and refilled manually with human labor. However, manual operation has it own undesirable aspects due to the inevitable human errors such that the liquid nitrogen often became completely vaporized before it was detected, causing irreparable damages to the test specimen, failure in experiments and/or loss in production.

SUMMARY OF THE INVENTION

The primary object of the present invention is to provide an improved apparatus and method for automatically refilling a liquid nitrogen container. More specifically, the primary object of the present invention is to provide an improved automatic liquid nitrogen refilling apparatus and method which includes a high-sensitivity liquid nitrogen level detector that will continuously monitor the level of liquid nitrogen contained in a cryogenic container and will activate a nitrogen refilling system if the level of the liquid nitrogen falls below a predetermined value. The apparatus/method disclosed in the present invention eliminates or minimizes the human errors associated with manual refilling, and it provides substantially improved reliability and accuracy in ensuring the required liquid nitrogen level, and can be manuactured at a lower cost.

The high-sensitivity liquid nitrogen level detector disclosed in the present invention comprises a YBaCuO (YBCO) type superconductiing material arranged in a serpentine shape. Typically, a critical (i.e., zero resistivity) temperature of about 90K can be obtained for a YBCO type superconductor. However, with proper controls in the manufacturing process, the critical temperature of the YBCO superconductor can be lowered to between about 77K to 80K This temperature corresponds to the boiling point temperature of liquid nitrogen (which is about 77K). Due to a relatively steep temperature gradient in the gas phase, the temperature of gaseous nitrogen at a small distance away from the region of gas-liquid interface will be a few degrees above this temperature. For the superconducting material such as YBCO, such a small increase in temperature will result in drastic increase in electric resistance (from 0 $\Omega$ to about 2,000 $\Omega$). Thus the YBCO superconducting material provides an excellent base material for forming a resistor-type circuitry to monitor the level of liquid nitrogen in a container.

In the present invention, the sensitivity of the YBCO based monitor can be further enhanced using a serpentine-shaped circuitry design to reduce the cross-section area of the YBCO conductor and increase the length thereof. The serpentine-shaped superconductor board can be easily fabricated using a photochemical etching process, which is well-known in the art.

The present invention offers many distinct advantages over the conventional capacitance-based methods for effectuating autofilling of liquid nitrogen. The conventional autofilling method often suffers significant errors due to the difficulties in trying to obtain accurate control of the liquid levels in the stainless steel tubes, involves complicated electric circuity, and requires high manufacturing cost. Also, the conventional autofilling method has very limited range of applications regarding the dimensions of the containers, and a controller made for one container generally cannot be used in another container of different dimension. On comparison, the present invention does not require an accurate control of the liquid level (or the liquid meniscus); it also requires a much simpler circuitry and can be inexpensively manufactured. Furthermore, the present invention can be used interchangeably in containers with a very wide ranges of sizes. The electric circuitry of the present invention can be adapted to use either AC or DC as the power source.

BRIEF DESCRIPTION OF THE DRAWING

The present invention will be described in detail with reference to the drawings showing the preferred embodiment of the present invention, wherein.

DETAILED DESCRIPTION OF THE PREFERRED EMBODIMENT

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

Figure 1:
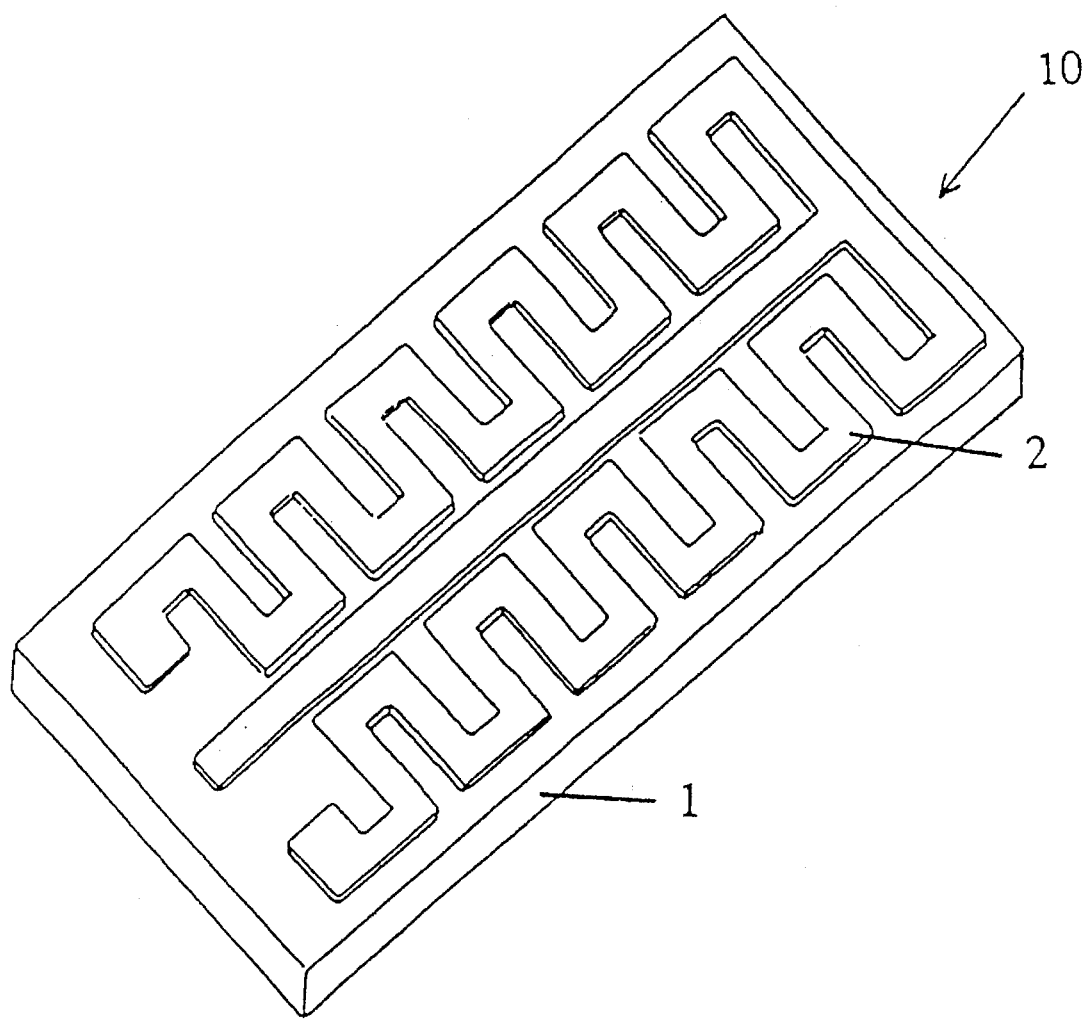
FIG. 1 is a perspective view of a preferred embodiment of the liquid nitrogen level monitoring element disclosed in the present invention which contains a serpentine-shaped superconducting film, obtained from a photochemical etching process, on a magnesium oxide substrate.
Figure 2:
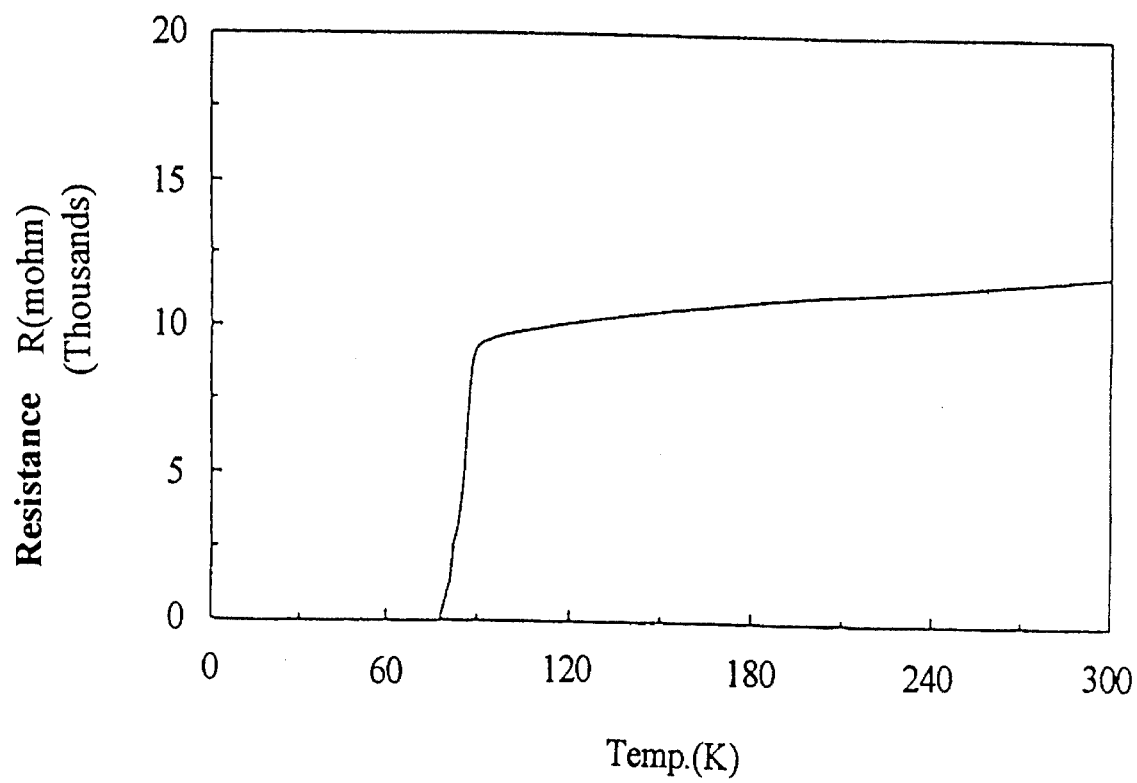
FIG. 2 is a plot of resistivity versus temperature (in K) for a YBCO superconducting film; it exhibits a superconducting temperature of about 78K, but the resistance increases to, and maintains at, about 2,000 $\Omega$ at temperatures from 90K to room temperature.

Now referring to the drawings. FIG. 1 shows a perspective view of a preferred embodiment of the liquid nitrogen level monitoring element, or liquid nitrogen level sensing element, 10 disclosed in the present invention. As discussed earlier, the present invention comprises a YBaCuO (YBCO) type superconductiing material arranged in a serpentine shape. FIG. 2, which shows a plot of the electric resistivity of a YBCO superconducting film at various temperatures (in K), indicates that the YBCO film exhibits superconducting behavior of zero resistance at temperatures below about 78K The resistance of the superconducting YBCO film increases to about 2,000 Ω and maintains nearly constant at temperatures from 90K to room temperature. Typically, a critical temperature of about 90K can be obtained for a YBCO type superconductor. However, with proper control in the manufacturing of the YBCO film, the critical temperature of the YBCO superconductor can be lowered to between about 77K to 80K This temperature corresponds to the boiling point temperature of liquid nitrogen (which is about 77K). The present invention, thus takes advantage of the coincidence of these two temperatures to provide a reliable and relatively inexpensive monitoring device to locate the "interface" between liquid and gaseous nitrogen.

Due to a relatively steep temperature gradient in the gas phase, the temperature of gas phase nitrogen at a short distance removed from the region of gas-liquid interface will be a few degrees above the boiling point temperature of liquid nitrogen. For a superconducting material such as YBCO, such a small increase in temperature will result in drastic increase in electric resistance (from 0 Ω to about 2,000 Ω, as shown in FIG. 2). Thus the YBCO superconducting material provides an excellent base material for forming a resistor-type monitor to monitor the level of liquid nitrogen in a container. The liquid nitrogen monitoring element 10 shown in FIG. 1 contains a serpentine-shaped YBCO superconducting film 2, obtained from a photochemical etching process, disposed on the surface of a magnesium oxide substrate 1.

Figure 3:
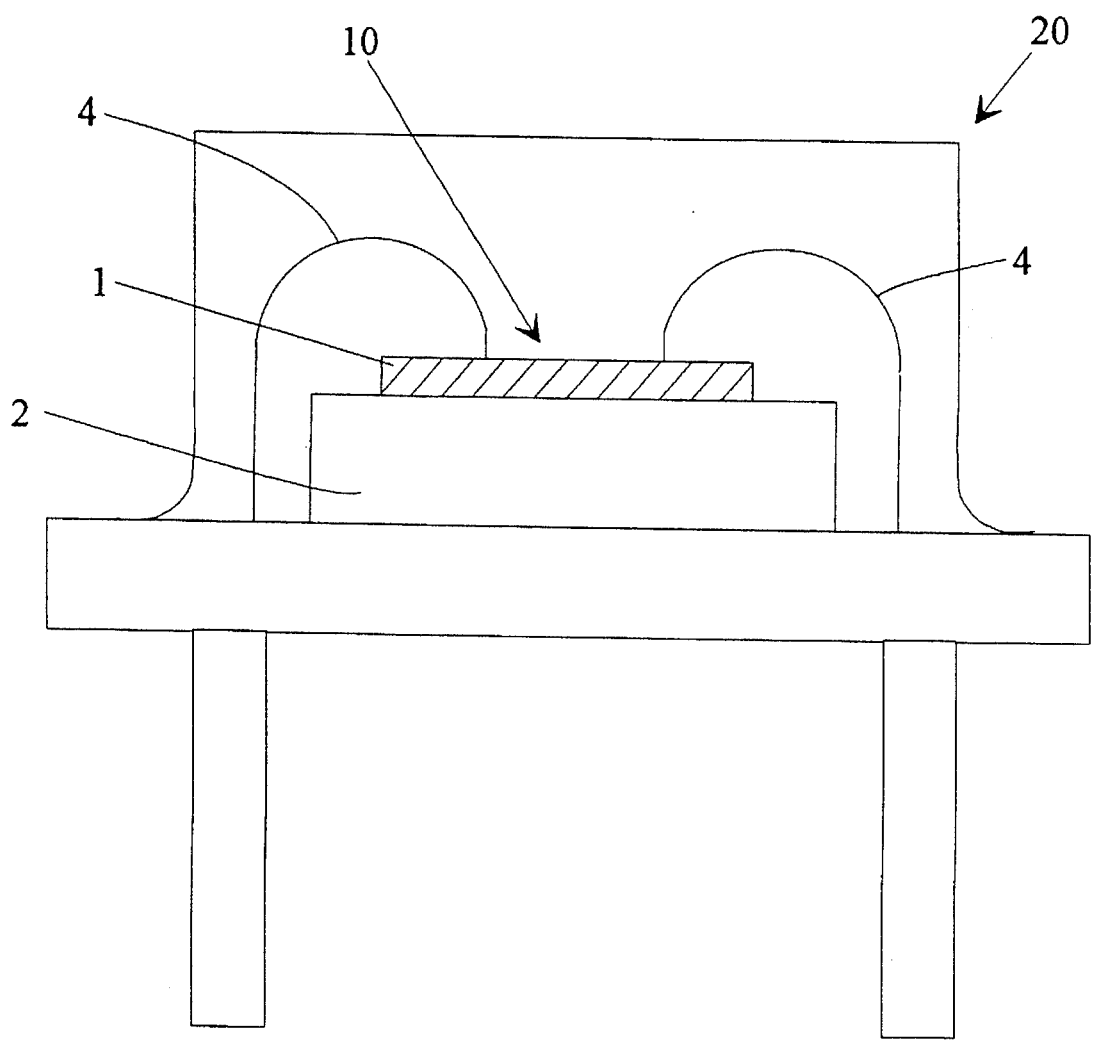
FIG. 3 is a schematic diagram of a liquid nitrogen monitoring element disclosed in the present invention which is sealed in a closed receptacle under vacuum or nitrogen.

FIG. 3 shows a schematic diagram of a liquid nitrogen monitoring element 10 disclosed in the present invention which is sealed in a closed receptacle 20 under vacuum or nitrogen, or any other inert gas. The liquid nitrogen monitoring element contains the YBCO superconducting film 2 disposed on the surface of a magnesium oxide substrate 1. The two ends of the YBCO superconducting film 2 are connected, respectively, to two conducting wires 4 to conduct electric power therethrough. The vacuum or nitrogen sealed environment inside the receptacle 20 enhances the stability and reliability of the superconducting film based monitoring element of the present invention.

Figure 4:
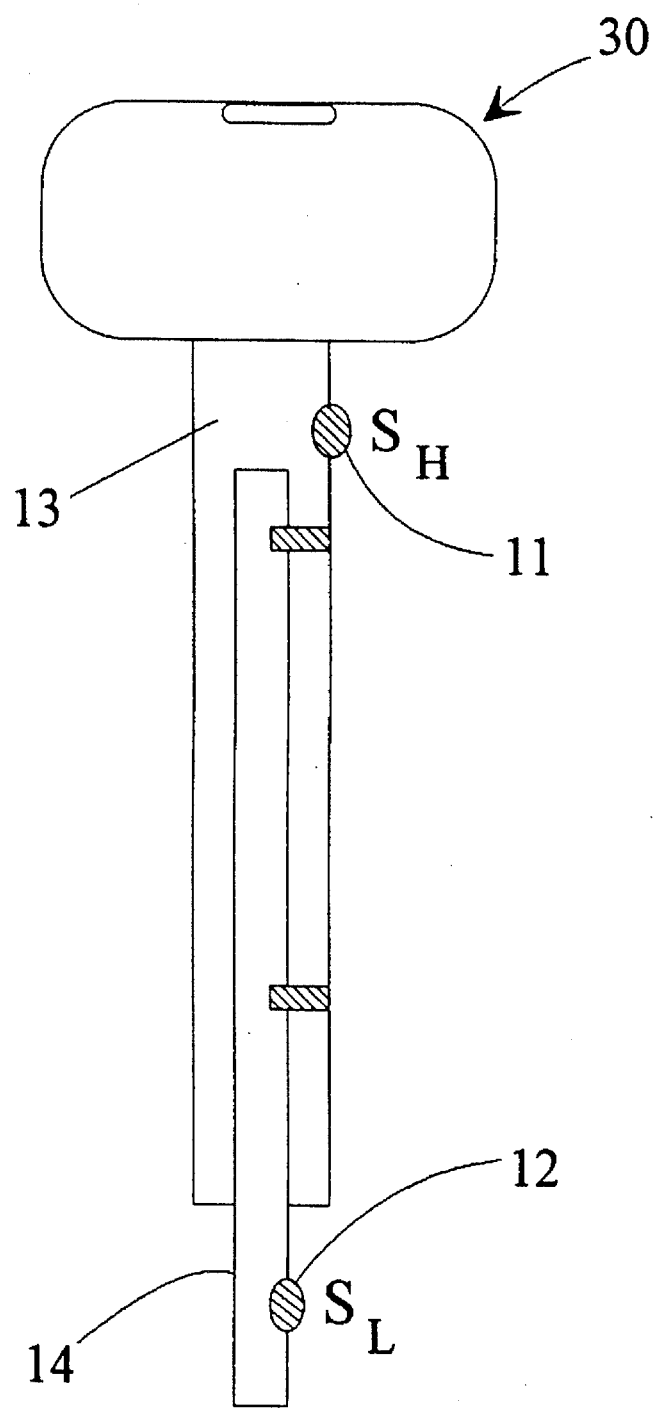
FIG. 4 is a schematic diagram of an automatic liquid nitrogen refilling control element of the present invention comprising two monitoring elements adjustably mounted on a fiber glass rod assembly.

In automatic liquid nitrogen refilling operations, a pair of liquid nitrogen monitoring elements 10 are utilized to control the start and end of the refilling operation. FIG. 4 shows a schematic diagram of an automatic liquid nitrogen refilling control element 30 of the present invention comprising two monitoring elements, an upper monitoring element $S_H$ or 11 and a lower monitoring element $S_L$ or 12, mounted on upper and lower fiber glass rods 13 and 14, respectively. The upper fiber glass rod 13 and the lower fiber glass rod are slidably affixed to each other to thereby allow adjustment of the distance between the two monitoring elements 11 and 12. Such an adjustable setup allows the present invention to work with a wide range of containers with varying dimensions. Each of the monitoring element, 11 or 12, can be connected to a solenoid valve to control the on and off the liquid nitrogen flow, thus causing the start and end, respectively, of the automatic refilling operations.

Figure 5:
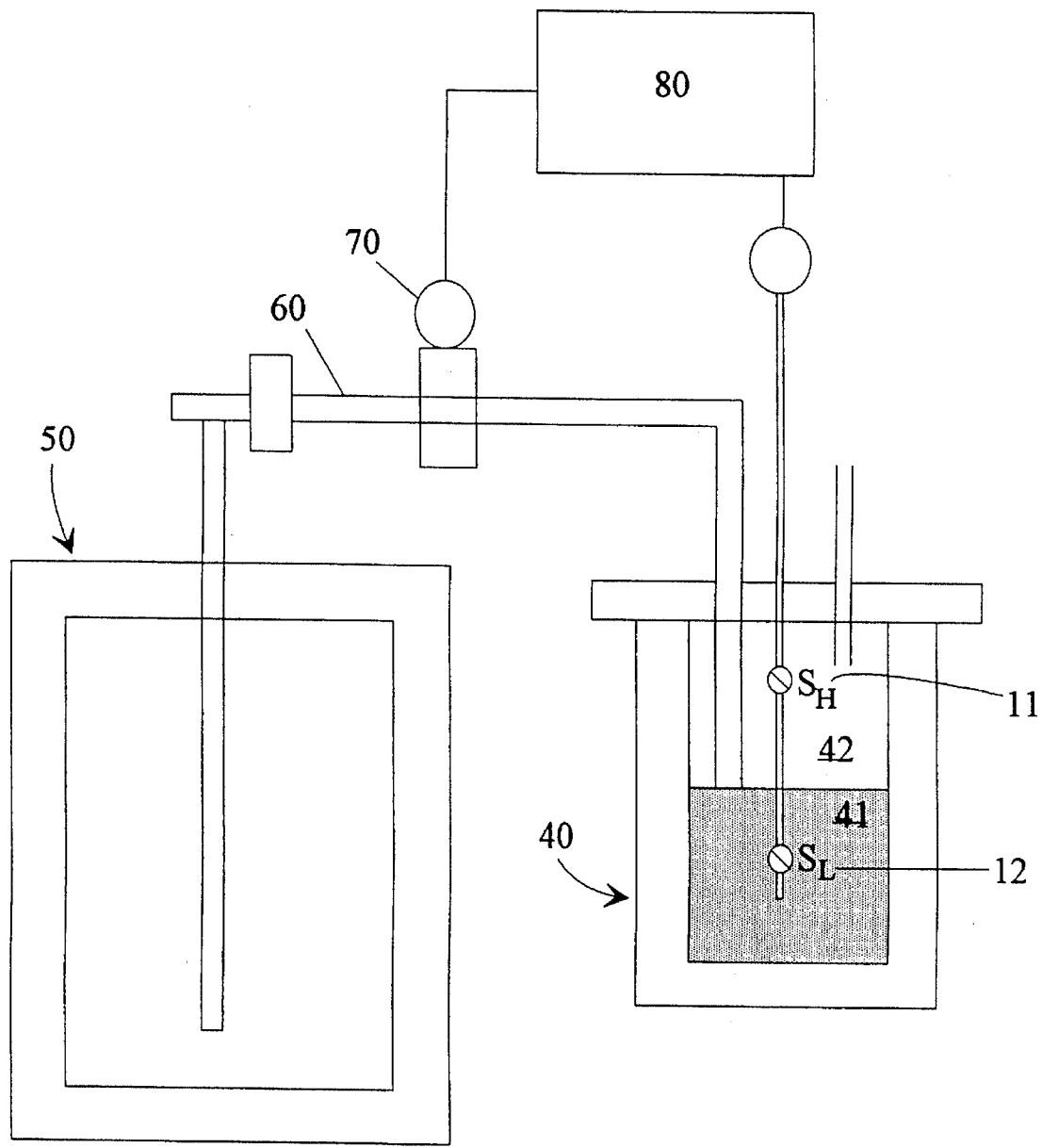
FIG. 5 is a schematic diagram of a preferred embodiment of the entire automatic liquid nitrogen filling system disclosed in the present invention.
Figure 6:
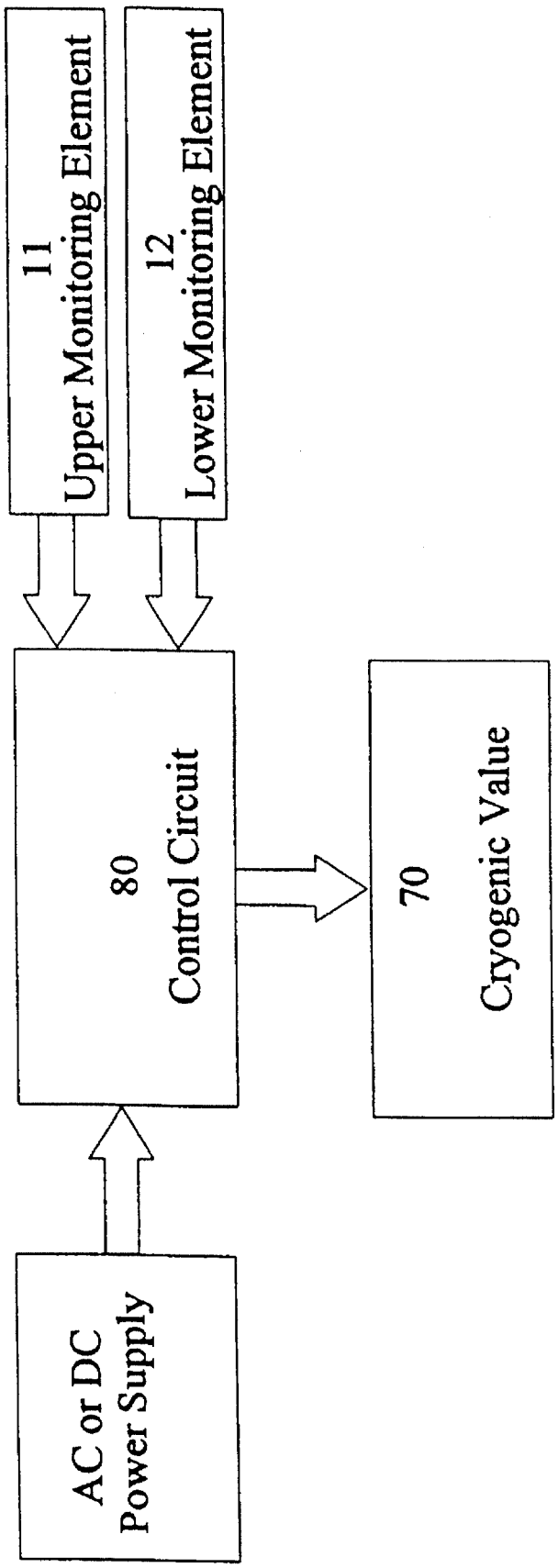
FIG. 6 is a flowchart diagram showing the control circuit utilized in FIG. 5.

FIG. 5 shows a schematic diagram of a preferred embodiment of the entire automatic liquid nitrogen filling system disclosed in the present invention. The automatic liquid nitrogen refilling control element 30 contains the upper monitoring element 11 and the lower monitoring element 12 adjustably mounted thereon is inserted inside a liquid nitrogen container 40, which contains liquid nitrogen in the lower portion 41 and gaseous nitrogen in the higher portion 42. Stock liquid nitrogen is supplied from a liquid nitrogen reservoir 50 via a liquid nitrogen delivery piping system 60, which contains a cryogenic valve 70. The cryogenic valve 70 can include one or more solenoid valves, which receive electric power from the control circuit 80 to open or close. The open or close of the cryogenic valve 70 is controlled by inputs from the upper and lower monitoring elements 11 and 12 as shown in FIG. 6, which is a flowchart diagram showing the operation of the control circuit utilized in FIG. 5.

Figure 7:
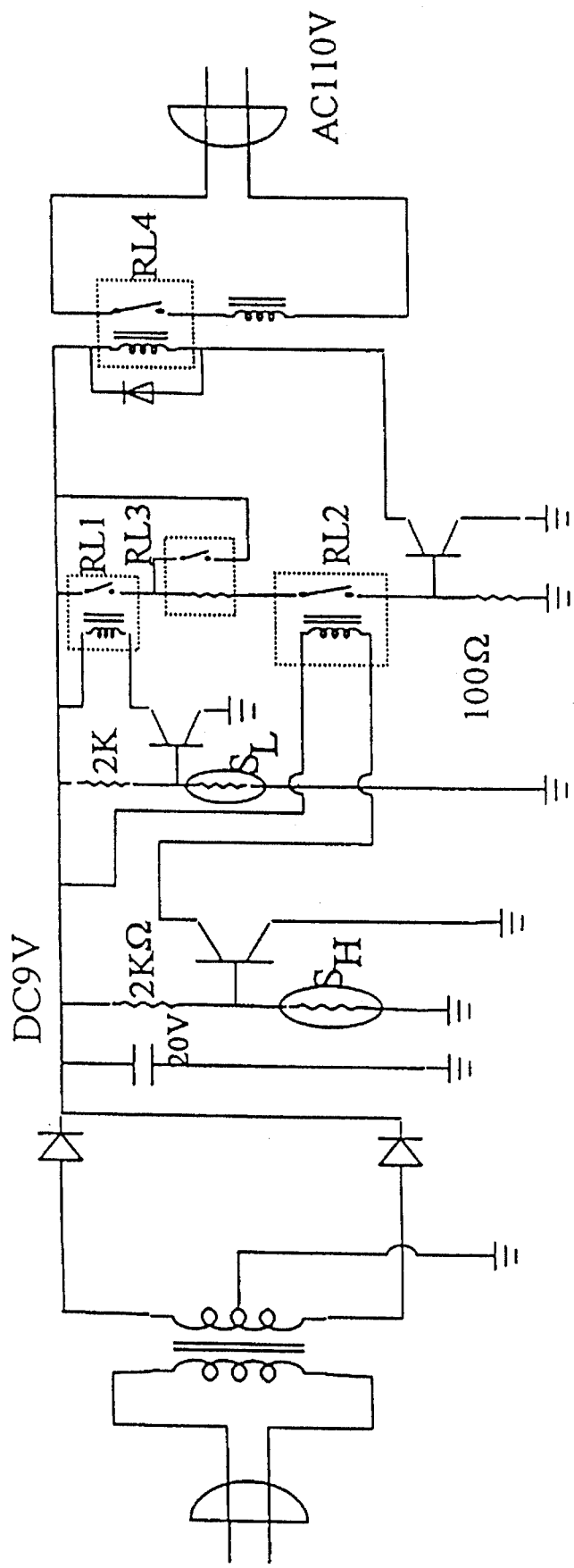
FIG. 7 is an example of a control circuit diagram providing the automatic liquid nitrogen filling operation disclosed in the present invention.

When the liquid nitrogen level in the container 40 falls below a predetermined level, which is controlled by the disposition of the lower monitoring element 12, this will cause the resistance of the serpentine-shaped YBCO film provided on the lower monitoring element 12 to rise and, via the control circuit 80, actuate the cryogenic valve 70 to open. This will cause liquid nitrogen to flow into the container 40 until it the liquid nitrogen level reaches another predetermined level controlled by the disposition of the upper monitoring element 12. This will cause the resistance of the YBCO film provided on the upper monitoring element 11 to drop and, again via the control circuit 80, actuate the cryogenic valve 70 to close, thus completing the refilling operation. The control circuit 80 can be operated with an AC power source; however, the power supply, as indicated by the rectangle 90, can be replaced by a battery, thus ensuring an uninterrupted monitoring and control of the liquid nitrogen level in the container 40. FIG. 7 is an example of a control circuit diagram providing the automatic liquid nitrogen filling operation disclosed in the present invention. $S_H$ is the upper monitoring element and $S_L$ is the lower monitoring element. RL1, RL2, and RL4 represent relay switches, and DC9V and AC110V represent a 9-V DC supply and a 110-V AC supply, respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An apparatus for automatically refilling liquid nitrogen to a liquid nitrogen container when said liquid nitrogen in said container falls below a first predetermined level, said liquid nitrogen container being connected to a liquid nitrogen reservoir via a cryogenic piping system, said apparatus comprising:

(a) a first liquid nitrogen monitoring element comprising a superconducting material disposed on a non-conducting substrate, said superconducting material having a critical temperature approximately equal to the boiling point temperature of said liquid nitrogen, said superconducting material being placed at or near said first predetermined level so that it exhibits zero or near zero resistance under normal conditions; and (b) a control means connected to both said first liquid nitrogen monitoring element and a cryogenic control valve such that when said superconducting material attains high resistance as a result of said liquid nitrogen falling below said first predetermined level, said control means will actuate said cryogenic control valve to open and allow said liquid nitrogen to flow from said reservoir to said container;

(c) wherein said superconducting material is a YBaCuO superconducting material, which is disposed on said non-conducting substrate in the shape of a narrow strip having a plurality of meandering loops so as to substantially reduce the amount of electric current passing therethrough;

(d) further wherein said non-conducting substrate is magnesium oxide.

2. The apparatus for automatically refilling liquid nitrogen to a liquid nitrogen container according to claim 1 wherein said cryogenic control valve is a cryogenic solenoid valve and said control means comprises an electric circuit.

3. The apparatus for automatically refilling liquid nitrogen to a liquid nitrogen container according to claim 1 which further comprises a second liquid nitrogen monitoring element placed above said first liquid nitrogen monitoring element and near a second predetermined level, wherein said second liquid nitrogen monitoring element is also connected to said control means such that when said superconducting material attains zero or near zero resistance as a result of said liquid nitrogen rising above said second predetermined level, said control means will actuate a cryogenic control valve to close and stop the flow of said liquid nitrogen from said reservoir to said container.

4. An apparatus for automatically refilling liquid nitrogen to a liquid nitrogen container when said liquid nitrogen in said container falls below a first predetermined level, said liquid nitrogen container being connected to a liquid nitrogen reservoir via a cryogenic piping system, said apparatus comprising:

(a) a first liquid nitrogen monitoring element comprising a superconducting material disposed on a non-conducting substrate, said superconducting material having a critical temperature approximately equal to the boiling point temperature of said liquid nitrogen, said superconducting material being placed at or near said first predetermined level so that it exhibits zero or near zero resistance under normal conditions; and (b) a control means connected to both said first liquid nitrogen monitoring element and a cryogenic control valve such that when said superconducting material attains high resistance as a result of said liquid nitrogen falling below said first predetermined level, said control means will actuate said cryogenic control valve to open and allow said liquid nitrogen to flow from said reservoir to said container;

(c) wherein said superconducting material is a YBaCuO superconducting material, which is disposed on said non-conducting substrate in the shape of a narrow strip having a plurality of meandering loops so as to substantially reduce the amount of electric current passing therethrough;

(d) further wherein said superconducting material has a serpentine shape, and said serpentine-shaped superconducting material is prepared by forming a layer of said superconducting material on said non-conducting substrate and photochemically etching said superconducting material layer in accordance with said serpentine shape.

5. A liquid nitrogen level monitoring element to be placed inside a liquid nitrogen container to provide information about whether said liquid nitrogen in said container has fallen below a predetermined level, said liquid nitrogen level monitoring element comprising a superconducting material disposed on a non-conducting substrate, wherein said superconducting material having a critical temperature approximately equal to the boiling point temperature of said liquid nitrogen, and said superconducting material being placed at or near said predetermined level so that it exhibits zero or near zero resistance under normal conditions;

wherein said superconducting material consists of a YBaCuO superconducting material, which is disposed on said non-conducting substrate in the shape of a narrow strip having a plurality of meandering loops so as to substantially reduce the amount of electric current passing therethrough; further wherein said non-conducting substrate is magnesium oxide.

6. The liquid nitrogen level monitoring element according to claim 5 which is sealed in a receptacle under vacuum.

7. The liquid nitrogen level monitoring element according to claim 5 which is sealed in a receptacle under an inert gas environment.

8. A liquid nitrogen level monitoring element to be placed inside a liquid nitrogen container to provide information about whether said liquid nitrogen in said container has fallen below a predetermined level, said liquid nitrogen level monitoring element comprising a superconducting material disposed on a non-conducting substrate, wherein said superconducting material having a critical temperature approximately equal to the boiling point temperature of said liquid nitrogen, and said, superconducting material being placed at or near said predetermined level so that it exhibits zero or near zero resistance under normal conditions;

wherein said superconducting material consists of a YBaCuO superconducting material, which is disposed on said non-conducting substrate in the shape of a narrow strip having a plurality of meandering loops so as to substantially reduce the amount of electric current passing therethrough;

further wherein said superconducting material has a serpentine-shape, and said serpentine-shaped superconducting material is prepared by forming a layer of said superconducting material on said non-conducting substrate and photochemically etching said superconducting material layer in accordance with said serpentine shape.

* * * * *